United States Patent Office 3,363,986
Patented Jan. 16, 1968

3,363,986
PROCESS FOR RECOVERY OF BORON
HALIDES FROM HYDROCARBONS
Anthony J. Guarnaccio, Niles, Ill., assignor to Universal
Oil Products Company, Des Plaines, Ill., a corporation
of Delaware
No Drawing. Continuation-in-part of application Ser. No.
452,349, Apr. 30, 1965, which is a division of application Ser. No. 210,247, July 16, 1962, now Patent No.
3,231,334. This application Apr. 21, 1966, Ser. No.
544,120
The portion of the term of the patent subsequent to
Jan. 25, 1983, has been disclaimed
10 Claims. (Cl. 23—205)

ABSTRACT OF THE DISCLOSURE

Separation of boron halide from hydrocarbon mixtures by sorption thereof in cyclic hydrocarbyl substituted sulfoxides.

---

This application is a continuation-in-part of my now abandoned application Ser. No. 452,349, filed Apr. 30, 1965 which is a division of my application Ser. No. 210,247, filed July 16, 1962, now U.S. Patent 3,231,334.

This invention relates to a process for the separation and recovery of a boron halide from a fluid mixture, and more particularly relates to a process for the separation and recovery of a boron halide utilizing a boron halide sorbent. Still more particularly, this invention relates to a process for the separation and recovery of a boron halide from a fluid mixture with a boron halide sorbent comprising a cyclic hydrocarbyl substituted sulfoxide thereby sorbing at least a portion of said boron halide with said sorbent, and subsequently recovering boron halide from said process.

The term "sorption" means a mechanism by which at least one component of a mixture selectively combines in some form with the medium with which the mixture is contacted; such mechanisms may be adsorption, absorption, clathration, occlusion or chemical reaction, and all these mechanisms are generically designated herein as "sorption."

It has been found that in the production of alkylated aromatic hydrocarbons utilizing a boron trifluoride-modified substantially inorganic oxide, alkylatable aromatic hydrocarbon, olefin-acting compound, and boron trifluoride, free boron fluoride will usually be found among the liquid hydrocarbon reaction products and unreactive off-gas. The recovery and reuse of the boron fluoride, therefore, results in extraordinary economy of operation.

The principal object of the present invention is to provide a process for the efficient and economical separation and recovery of the boron fluoride from a fluid mixture. Another object of this invention is to provide a process whereby the boron halide can be separated continuously from the hereinbefore mentioned hydrocarbon reaction products without appreciable consumption and loss of the recovered boron halide. Another object of this invention is to provide a process whereby the boron halide can be separated continuously from the hereinabove mentioned fluid mixtures without appreciable consumption or loss of the recovered boron fluoride-free fluid. Other objects of this invention will be set forth hereinafter as part of the specification and in the accompanying examples.

In one embodiment, the present invention relates to a process for the separation of a boron halide from a fluid mixture containing the same which comprises contacting said fluid mixture with a cyclic hydrocarbyl substituted sulfoxide of the general formula

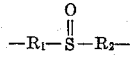

wherein —$R_1$ and $R_2$— are divalent radicals selected from the group consisting of alkylene, alkenylene, alicyclic and arylene radicals and are linked together to form a cyclic sulfoxide at conditions to retain at least a portion of the boron halide in the sulfoxide.

Another embodiment of the present invention relates to a process for the separation of boron fluoride from a fluid mixture containing the same which comprises contacting at a temperature of from about —50° to about +300° C. and a pressure of from about atmospheric to about 200 atmospheres said fluid mixture with a cyclic hydrocarbyl substituted sulfoxide of the general formula

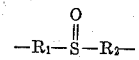

wherein —$R_1$ and $R_2$— are divalent radicals selected from the group consisting of alkylene, alkenylene, alicyclic and arylene radicals and are linked together to form a cyclic sulfoxide at conditions to retain at least a portion of the boron fluoride in the sulfoxide.

A specific embodiment of the present invention relates to a process for the separation of boron fluoride from a refinery off-gas containing the same which comprises contacting said off-gas with tetrahydrothiophene-1-oxide at contacting conditions including a temperature of from about —50° to about +300° C. and a pressure of from about atmospheric to about 200 atmospheres to retain at least a portion of said boron fluoride in the sulfoxide.

A further specific embodiment of the present invention relates to a process for the separation of boron fluoride from benzene containing the same which comprises contacting said benzene with thiophene-1-oxide at contacting conditions including a temperature of from about —50° to about +300° C. and a pressure of from about atmospheric to about 200 atmospheres to retain at least a portion of said boron fluoride in the sulfoxide.

Other embodiments of the present invention will become apparent in considering the specification as hereinafter set forth.

As set forth hereinabove, the present invention relates to a process for the separation of a boron halide from a fluid mixture utilizing a cyclic hydrocarbyl substituted sulfoxide as the sorption agent. Suitable cyclic hydrocarbyl substituted sulfoxides include those sulfoxides represented by the general formula

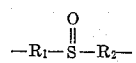

wherein the —$R_1$ and the $R_2$— are divalent radicals selected from the group consisting of the alkylene, alkenylene, alicyclic and arylene radicals and are linked together to form a cyclic sulfoxide. These sulfoxides include, for example, the alicyclic sulfoxides such as dicyclopentyl sulfoxide, dicyclohexyl sulfoxide, etc., tetra-hydro-thiophene oxides (commonly called cyclotetramethylene sulfoxide):

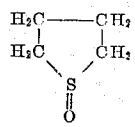

and dihydro-1-thiophene oxide:

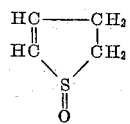

and their homologues wherein any one or more of their hydrogen atoms may be replaced by a radical such as —R$_1$ and R$_2$—, said radicals having the same definition as hereinbefore set forth.

The process of this invention may be successfully applied to and utilized with many fluids and fluid mixtures. Suitable gases include such components as hydrogen, methane, ethane, propane, inert gases, etc., and mixtures thereof. Suitable paraffins are normal butane, isobutane, normal pentane, isopentane, normal hexane, etc. Suitable cycloparaffins are cyclopentane, methylcyclopentane, cyclohexane, methylcyclohexane, and other alkyl cycloparaffins and mixtures thereof. Suitable aromatic hydrocarbons include benzene, toluene, and other alkyl benzenes and mixtures thereof. Preferred hydrocarbons utilized within the process of the present invention are monocyclic aromatic hydrocarbons, that is, benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc., and mixtures thereof. Very often alkalate is obtained as a high boiling fraction in which the alkyl group attached to the aromatic nucleus varies in size from about C$_9$ to about C$_{18}$. Other suitable aromatic hydrocarbons, which at specified sorption conditions, depending upon the melting point of the compound chosen, would be in liquid form, would include hydrocarbons with two or more aryl groups such as diphenyl, diphenyl methane, and others. Examples of other aromatic hydrocarbons within the scope of this invention which at specified sorption conditions depending upon the melting point of the compound chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that may be utilized in the process of the present invention, the benzene hydrocarbons are preferred, and of the preferred benzene hydrocarbons, benzene itself is particularly preferred.

In addition, the process of this invention may be successfully applied to and utilized with olefinic hydrocarbons. Suitable olefins include monoolefins containing one double bond per molecule and polyolefins which contain more than one double bond per molecule. Thus, suitable olefins include ethylene, propylene, 1-butene, 2-butene, isobutylene, and higher molecular weight normally liquid olefins such as the various pentenes, hexenes, heptenes, octenes, and mixtures thereof, and still higher molecular weight liquid olefins, the latter including various olefin polymers having from about 9 to about 18 carbon atoms per molecule and including propylene trimer, propylene tetramer, propylene pentamer, etc. Cycloolefins such as cyclopentene, methylcyclopentene, cyclohexene, methylcyclohexene, etc., may also be utilized.

The process of this invention may be utilized when these hydrocarbons are present as mixtures in minor quantities in various gas streams. Thus, the normally gaseous hydrocarbon for use in the process of this invention need not be concentrated. Such normally gaseous hydrocarbons appear in minor quantities in various refinery gas streams, usually diluted with gases such as hydrogen, nitrogen, methane, etc. The boron halide content of the streams may be separated and recovered utilizing the process of the present invention.

In accordance with the process of the present invention, the separation of boron halide from a fluid mixture is effected by contacting said fluid mixture with a cyclic hydrocarbyl substituted sulfoxide at contacting conditions including a temperature of from about —50° or lower to about +300° C. or higher, and preferably from about 10° C. to about 200° C., although the exact temperature needed will depend upon the particular fluid to be purified, the particular boron halide to be separated and the particular sulfoxide utilized. The process is usually carried out at a pressure of from about atmospheric to about 200 atmospheres. The pressure utilized is usually selected to effect the desired selective sorption. The boron halide may then be subsequently desorbed from the sulfoxide in any suitable manner. This may comprise one or more of the following including (1) treating at moderate or elevated temperatures and super-atmospheric pressure, atmospheric pressure or sub-atmospheric pressure, (2) treating the boron halide-sorbent complex with ammonia or amines to form boron halide-ammonia complexes which then are separated and decomposed with sulfuric acid, for example, or (3) by combining the boron halide-sorbent complex, and particularly the boron fluoride-sorbent complex, with metal halides such as, for example, calcium fluoride, lithium fluoride, silver fluoride, sodium fluoride, etc. to form fluoborates and by decomposing the latter at high temperatures with the liberation of boron fluoride. When other boron halides are used, the corresponding metal halide preferably is employed.

It is also contemplated within the scope of this invention that the hereinbefore mentioned cyclic hydrocarbyl substituted sulfoxides may, if desired, be utilized in conjunction with water, and organic compounds such as the various alcohols, ketones, aldehydes, ethers, lower aliphatic acids, etc., although not necessarily with equivalent results, to improve the selectivity, solubility, stability and to lower the boiling temperature of the selected sulfoxide for use in the process of this invention.

In removing the hereinbefore mentioned boron halide from a fluid mixture with the type of sorption media herein described, either batch or continuous operations may be employed. Although the invention is particularly applicable to the separation and recovery of boron fluoride from fluid mixtures it may also be used for the separation of boron chloride or other boron halides from such mixtures when present alone or in admixture with boron fluoride. The actual operation of the process may be either upflow or downflow. The details and processes of this general character are familiar to those skilled in the art and any necessary additions or modifications of the above general procedures will be more or less obvious and can be made without departing from the broad scope of this invention.

The process of the present invention is illustrated by the following examples which are introduced for the purpose of illustration only and with no intention of unduly limiting the generally broad scope of the invention.

*Example I*

A synthetic refinery off-gas containing 88% nitrogen and 12% boron trifluoride is contacted with tetrahydrothiophene-1-oxide in a sorption zone maintained at a temperature of about 85° C. and 10 atmospheres. The boron fluoride is sorbed by the tetrahydrothiophene-1-oxide and the boron trifluoride and nitrogen are subsequently separately recovered. The nitrogen recovered from the sorption zone shows substantial sorption of the boron trifluoride occurring as evidenced by negative analytical tests of the nitrogen for boron trifluoride.

*Example II*

A mixture of boron fluoride and benzene containing about 5 p.p.m. (wt.) water is contacted with thiophene-1-oxide in a sorption zone maintained at a temperature of about 35° C. and atmospheric pressure. The boron fluoride is sorbed by the thiophene-1-oxide resulting in a small temperature increase. The boron fluoride and benzene are subsequently separately recovered. The benzene recovered from the sorption zone shows substantial sorption occurring as evidenced by negative analytical tests of the benzene for boron fluoride.

*Example III*

A mixture of boron fluoride and ethylbenzene containing about 5 p.p.m. (wt.) water is contacted with dihydrothiophene-1-oxide in a sorption zone maintained at a temperature of about 50° C. and atmospheric pressure. The boron fluoride is sorbed by the dihydrothiophene-1-oxide resulting in a small temperature increase. The boron fluoride and ethylbenzene are subsequently separately recovered. The ethylbenzene recovered from the sorption zone shows substantial sorption of the boron trifluoride occurring as evidenced by negative analytical tests of the ethylbenzene for boron trifluoride.

*Example IV*

Results similar to those obtained in Example I are obtained when thiophene-1-oxide is substituted for tetrahydrothiophene-1-oxide in the process described in Example I.

*Example V*

Results similar to those obtained in Example II are obtained when a synthetic off-gas containing 90% ethylene and 10% boron fluoride is substituted for the synthetic off-gas in the process described in Example II utilizing as the boron fluoride sorbent dihydrothiophene-1-oxide.

I claim as my invention:

1. A process for the separation of a boron halide from a hydrocarbon mixture containing the same which comprises contacting said mixture with a cyclic hydrocarbyl substituted sulfoxide of the general formula

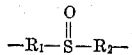

wherein —$R_1$ and $R_2$— are divalent radicals selected from the group consisting of alkylene, alkenylene, alicyclic and arylene radicals, said $R_1$ and $R_2$ being the same and being linked together to form a cyclic sulfoxide, at a temperature of from about −50° to about +300° C. and a pressure of from about atmospheric to about 200 atmospheres to retain at least a portion of the boron halide in the sulfoxide and subsequently separating boron halide from said sulfoxide.

2. The process of claim 1 further characterized in that said boron halide is boron fluoride.

3. The process of claim 1 further characterized in that said sulfoxide is selected from the group consisting of tetrahydrothiophene-1-oxide, thiophene-1-oxide, dicylcopentyl sulfoxide, dicyclohexyl sulfoxide, cyclotetramethylene sulfoxide and dihydro-1-thiophene oxide.

4. The process of claim 1 further characterized in that said sulfoxide is tetrahydrothiophene-1-oxide.

5. The process of claim 1 further characterized in that said sulfoxide is a dihydrothiophene-1-oxide.

6. The process of claim 1 further characterized in that said sulfoxide is thiophene-1-oxide.

7. The process of claim 1 further characterized in that said mixture is a gaseous mixture.

8. The process of claim 1 further characterized in that said mixture comprises liquid hydrocarbon.

9. The process of claim 8 further characterized in that said liquid hydrocarbon is an aromatic hydrocarbon.

10. The process of claim 9 further characterized in that said aromatic hydrocarbon is benzene.

References Cited

UNITED STATES PATENTS

| | | | |
|---|---|---|---|
| 2,378,968 | 6/1945 | Axe | 23—205 |
| 3,126,248 | 3/1964 | Pohl et al. | 23—205 |
| 3,231,334 | 1/1966 | Guarnaccio | 23—205 |

MILTON WEISSMAN, *Primary Examiner.*

OSCAR R. VERTIZ, *Examiner.*

G. OZAKI, *Assistant Examiner.*